UNITED STATES PATENT OFFICE 2,212,654

PROCESS FOR PREPARING QUATERNARY AMMONIUM COMPOUNDS AND INTERMEDIATES THEREFOR

Walter Valentine Wirth, Woodstown, N. J., and Robert Freeman Deese, Jr., Wilmington, Del., assignors to E. I. du Pont de Nemours & Company, Wilmington, Del., a corporation of Delaware No Drawing. Application December 17, 1938, Serial No. 246,498

10 Claims. (Cl. 260—295)

This invention relates to an improved process for preparing quaternary ammonium compounds possessing a long-chain acyl amido radical in their structure. More particularly, this invention relates to the production of compounds of the general formula

wherein R is an alkyl radical having from 8 to 20 carbon atoms in its structure, X is the anion of a water-soluble acid, while N(tert) represents a tertiary base of the group consisting of pyridine, the C-alkyl pyridines and quinoline. Compounds of the above type are useful as water-repellency agents, that is, reagents for rendering textile fibers water-repellent. (See Br. Patent 477,991.)

It is an object of this invention to provide a process for preparing compounds of the above type in good yield and in a high state of purity. It is a further object of this invention to provide a process for preparing the above compounds with a high degree of economy both as to materials consumed and labor. It is a further object of this invention to provide a process for preparing the intermediate methylol compounds for the above reagents in a state or medium whereby they can be directly converted into said final compounds without isolation and without sacrifice of substantial quantities of solvents or other materials employed in the manufacture of said intermediates. Other and further important objects of this invention will appear as the description proceeds.

To facilitate discussion of this invention, without however any intent to limit its scope, we shall consider at first the particular compound stearamido-methyl-pyridinium chloride, whose structure is represented by the formula

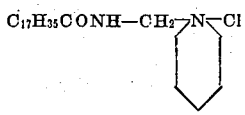

This compound was first employed for water-repellency purposes in British Patent No. 477,991, and its preparation has been more fully described and claimed in British Patent No. 475,170.

As taught by these patents, two principal methods were applicable for the production of said compound. According to one of these, stearamide, paraformaldehyde and pyridine hydrochloride were reacted jointly in the presence of free pyridine. The process thus called for the simultaneous interaction of three reagents, or at least for the simultaneous presence of three reactants in a fourth, apparently non-reacting, medium. In actual practice, however, this process does not give satisfactory yields for large-scale, commercial manufacture. Furthermore, inasmuch as it is difficult and impractical to separate the desired reaction product from residual unreacted material or from by-products formed in the reaction, the crude product of the above process is generally of a low degree of purity and of low water-repellency power.

The other method suggested by said patents requires the interaction of methylol-stearamide, $C_{17}H_{35}CONH-CH_2OH$ with pyridine-hydrochloride in pyridine, part of which may be replaced by an inert organic solvent. This process gives considerably better yields and a much purer product, only it requires the separate, preliminary preparation of stearamido-methylol. The process for effecting this, as suggested in one of said patents consists of reacting stearamide with aqueous-formaldehyde in the presence of a relatively strong inorganic alkali such as potassium carbonate, and optionally in the further presence of alcohol.

In U. S. Patent No. 1,952,008, Ex. 11, a process for preparing oleyl-amido methanol

is described, which is a substantial duplicate of the process hereinabove referred to. Apparently the art consistently believed that to prepare the methylol derivative of a higher fatty acyl amide one must work in an aqueous or alcoholic medium, that is a medium containing hydroxyl groups, and must employ a water-soluble (or alcohol soluble) and relatively strong alkali. The disadvantage of this practice is that it requires the isolation of the intermediate methylol compound in dry form, prior to its use in the further manufacture of the said quaternary compounds.

We have now found, that the synthesis of the intermediate methylol compound may be effected in an organic medium free from hydroxyl groups, and that the synthesis may be effected in the total absence of any base; or in the presence of a relatively weak, tertiary organic base, more especially pyridine, a C-alkyl-pyridine or quinaline, in other words, the same base that is to be used subsequently in the formation of the quaternary compound. This is a very important discovery, because it enables us to prepare the subsequent quaternary compound by direct action, with the proper reagents, upon the reaction mass in which the methylol compound was formed, without troubling to isolate the latter, and without substantial waste of any of the materials employed in its synthesis.

Based on the above discovery, our invention, therefore, comprises a method for synthesizing stearamido-methyl-pyridinium chloride, and similar compounds of the above general formula, by reacting together first a higher, fatty acyl-amide, that is a compound of the formula R—CONH$_2$, wherein R is an aliphatic radical having from 8 to 20 carbon atoms, with paraformaldehyde, in an anhydrous organic liquid medium free from hydroxyl groups, and preferably in the further presence of a tertiary base from the group: pyridine, the C-alkyl pyridines and quinoline. Then, without isolating the intermediate methylol, we add to the reaction mass further quantities of said tertiary base, until the mass contains 1 mole or a little over 1 mole of said tertiary base for each mole of fatty acyl-amide started with, and either simultaneously or subsequently we feed in hydrogen chloride or any other selected acid or acid anhydride, to complete the formation of the quaternary compound.

Obviously, the greatest economy of materials and simplicity of procedure is obtained when one employs pyridine itself (or other tertiary base of the above group) as the reaction medium for the fatty-amide and paraformaldehyde. In that case, provided the quantity of pyridine employed is at least one mole per mole of the amide, one needs to follow up the first reaction (formation of the methylol compound) merely by feeding in hydrogen chloride, acetic anhydride or any other selected acid or acid anhydride, and the formation of the quaternary compound is thus completed without the handling of any extraneous materials.

Nevertheless, the process wherein insufficient tertiary base or no tertiary base at all is used in the first reaction is also practical and gives good results. In that event, the operator has a choice in the next step of procedure between adding first pyridine and then hydrogen chloride (or other acid anhydride), or feeding in the two simultaneously, or adding an addition compound of the two as typified by pyridine-hydrochloride. The non-basic solvent, say benzene, which in this mode of operation had to be employed in the first step of the procedure, may be left in the reaction mass during the second step and then distilled off after the formation of the quaternary compound. Where, however, one particularly desires it, one may distill off this solvent at the end of the first reaction, thus obtaining the acyl-amido-methylol in substance, in excellent yield and high state of purity.

Without limiting our invention to any particular procedure, the following examples, in which parts by weight are given, will serve to illustrate our preferred mode of operation.

Example 1

114 parts of stearamide, 18 parts of paraformaldehyde, 40 parts of pyridine and 400 parts of ethylene chloride are heated together nine hours at 75° to 80° C. The charge is cooled to 15° C. and 18.6 parts of phosphorus trichloride are added slowly at a temperature of 15° to 30° C. The charge is heated then to 60° C., and held at this temperature for 30 minutes, after which it is cooled to 15° C., filtered, and the product dried. 167 parts of mixed stearamido methyl pyridinium chloride and phosphate are obtained.

If desired, the reaction mass obtained in the first step of the procedure, after cooling to 15° C. may be filtered. The filter cake after drying off the solvent, slurrying in water and drying again, gives a good yield of N-hydroxymethyl-stearamide, in substance. This may be further converted into the quaternary compound in a separate operation, by treatment with a salt of pyridine in pyridine solution, according to said British Patent No. 475,170.

Example 2

112 parts of stearamide, 400 parts of ethylene chloride, 30 parts of pyridine and 18 parts of paraformaldehyde are heated together for six hours at about 62° to 68° C. Then 49 parts of pyridine are added and dry hydrogen chloride is passed into the charge at 60° to 65° C. until it is acid to Congo red. 8 parts of pyridine are then added to make the charge neutral to Congo red, and the latter is heated for 3½ hours at 60° to 65° C. The solution is cooled slowly to 15° C., and the resulting precipitate is filtered and dried. 210 parts of a product analyzing 53.4% stearamido methyl pyridinium chloride are obtained.

Example 3

114 parts of stearamide, 18 parts of paraformaldehyde, 45 parts of pyridine and 50 parts of acetone are heated together ten hours at 70° to 75° C. 250 parts of acetone are added to form a smooth slurry and the mass is cooled to 15° C. 18.6 parts of 85% phosphoric acid are added followed by the addition of 20.4 parts of phosphorus pentoxide. The charge is agitated at room temperature for one hour and then heated at 50 to 55° C. for about four hours. At the end of this time it is discharged from the flask and dried at 40 to 45° C. About 185 parts of crude stearamido methyl pyridinium phosphate are obtained. If desired, the reaction mass obtained in the first step of the procedure, after cooling to 15° C., may be filtered to isolate N-hydroxymethyl-stearamide in a high state of purity, melting at about 108.1 to 109.5° C.

Example 4

399 parts of stearamide, 65 parts of paraformaldehyde, 157.5 parts of pyridine and 175 parts of acetone are heated together at 70° C. for 10 hours. The slurry is cooled at 60° C., 875 parts of fresh acetone are added, and the whole is further cooled to 20° C. 73.5 parts of phosphorus oxychloride are then added at 20° to 25° C. during 40 minutes. After agitating the resulting thick mass for 1 hour at 25° C., it is heated to 58° C., held there one hour and 750 parts of acetone are distilled off. The molten residue is cast in an open pan and dried. 668 parts of crude mixed stearamido methyl pyridinium chloride and phosphate are obtained, which analyzes 71% pure as the chloride. Instead of distilling off the acetone, it is possible also to recover the reaction product by simply cooling the reaction mass and filtering.

In lieu of acetone in the above example, various other solvents may be used, for instance hexane, methylethyl ketone, benzene or ethylene chloride.

Example 5

114 parts of stearamide, 18 parts of paraformaldehyde, 43 grams of pyridine and 50 parts of hexane are heated together 10 hours at 70° to 75° C. 225 parts of hexane are added to the slurry and the whole is cooled to 20° C. 20.4 parts of phosphorus oxychloride are added slowly to the mixture, holding the temperature at 20° to 25° C. during this addition. The mass is then agitated for 1½ hours without cooling. The heat of reaction increases the temperature to about 35° C. It is then heated to 60° C., and held 1 hour at 60° C., at the end of which time 134 parts of hexane is distilled off and the molten residue (temperature about 69° C.) is cast in an open pan and dried. 186 parts of crude mixed stearamido methyl pyridinium chloride and phosphate are obtained. The crude product analyzes about 70% purity as the chloride.

Example 6

114 parts of stearamide, 18 parts of paraformaldehyde, 43 parts of pyridine and 50 parts of hexane are heated together for ten hours at 70° to 75° C. 225 parts more of hexane are added and the slurry is cooled to 20° C. 21.1 parts of thionyl chloride ($SOCl_2$) diluted with 25 cc. of hexane are then added slowly to the mass at 20° to 25° C. After all of the thionyl chloride solution is added, the charge is heated gradually to 60° and held at 60° to 65° C. for one hour. Sulfur dioxide is evolved and boils off. Some of the hexane is distilled off and the liquid residue is poured into a pan and dried. 167 parts of a product containing 128 parts of stearamido-methyl-pyridinium chloride are obtained.

Example 7

113 parts of stearamide, 18 parts of paraformaldehyde and 70 parts of pyridine are heated together with agitation for 5 hours at 75° to 80° C. At the end of this time, 17 parts more of pyridine and 120 parts of glacial acetic acid are added. The temperature is held at 75° to 80° C. for two hours, and then 40 parts of acetic anhydride are added over a period of 30 minutes. A slurry is formed with the addition of the acetic acid, but complete solution occurs after the addition of the acetic anhydride. At this point, the solution is held for about 1 hour at 75° to 80° C., and then allowed to cool to 30° C. 361 parts of a thin paste, analyzing about 30% stearamido methyl pyridinium acetate, is obtained.

If desired, the reaction mass obtained in the first step, after holding for four or five hours at 75 to 80° C., may be drowned in water, slurried with the addition of sufficient hydrochloric acid to neutralize the pyridine, and the precipitated product filtered off and dried. N-hydroxymethyl-stearamide is thus obtained in excellent yield.

Example 8

114 parts of stearamide, 18 parts of paraformaldehyde and 300 parts of hexane are heated together for 22 hours at 60° to 65° C. 50 parts more of hexane are added and the slurry is cooled to 15° C., filtered and the precipitate dried at 45° C. 110 parts of N:hydroxy-methyl-stearamide are thus obtained.

Instead of isolating the last named intermediate, it may be converted in situ into a quaternary compound, by adding pyridine and phosphorus oxychloride, in the order named to the cooled slurry and then heating further, as in the preceding examples, to complete the reaction.

Instead of stearamide, in any of the aforegoing examples, other higher fatty acid amides may be employed, for instance the amides derived from oleic acid, palmitic acid, lauric acid, the fatty acids of coconut oil, palm oil, cottonseed oil or tallow, or the derived fatty acids such as those obtained from hydrogenated fats.

In lieu of the solvents hereinabove mentioned, other inert solvents free from hydroxyl groups may be employed.

The following additional examples illustrate further the above mentioned variations, and show clearly the wide choice of conditions which are possible of use without invention.

Example 9

114 parts of stearamide, 18 parts of paraformaldehyde, and 300 parts of benzene are heated together for 10 hours at 75° to 80° C. The mass is cooled to 20° C., filtered, and the precipitate is dried. A high yield of N:hydroxymethyl stearamide is obtained, of M. P. 109.0° to 110.5°.

In lieu of benzene in the above example, an equal quantity of a petroleum fraction of saturated hydrocarbons (boiling range 122 to 139° C. for 90%) may be employed, with equal success.

Example 10

114 parts of stearamide, 18 parts of paraformaldehyde, 1.3 parts of pyridine and 300 parts of a petroleum solvent (boiling range 55° to 71° C.) are heated together for 22 hours at 60° C. to 65° C. The charge is cooled at 15° C. and filtered. The precipitate is dried and 111.7 parts of N:hydroxy-methyl stearamide is obtained. It has a melting point of 108° C. to 110° C.

This condensation probably can be completed within a shorter time than 22 hours, say within 12 hours; however, it is preferable to heat for longer periods when a lower boiling solvent is used.

If in lieu of 1.3 parts of pyridine are employed 10 parts of triethylamine, similar results are obtained.

Example 11

56 parts of caprylamide, 18 parts of paraformaldehyde, 25 parts of pyridine and 200 parts of methyl-ethyl-ketone are heated together 10 hours at 75° to 80° C. The charge is cooled to 15° C. and the resulting slurry is filtered and the product dried. 35 parts of N:hydroxy-methyl-caprylamide are thus obtained, which may be further converted into quaternary compounds by the method of British Patent No. 475,170 of the methods of the aforegoing examples.

Example 12

50 parts of lauric acid amide, 11.2 parts of paraformaldehyde, 10.0 parts of triethylamine and 150 parts of hexane are heated to 60° C. and held at 60° to 65° C. for twelve hours. The charge is then cooled to 15° C., filtered and dried. 50 parts of N:hydroxy-methyl lauric acid amide are obtained.

In lieu of triethylamine, tributylamine, pyridine or any other convenient tertiary base may be employed.

We claim:

1. In the process of preparing quaternary ammonium compounds useful in the art of waterproofing textile fiber, the step which comprises reacting a higher fatty-acid amide with paraformaldehyde in a non-aqueous, non-alcoholic, organic liquid medium, selected from the group consisting of inert organic liquids, liquid tertiary organic bases, and mixtures of the two, but in the absence of any quaternary salts of said bases and in the absence of inorganic bases, whereby to form an N-hydroxy-methyl derivative of said higher fatty amide in situ, and then further reacting said reaction mass, without isolating the intermediate N-hydroxy-methyl derivative, with a water-soluble salt of a heterocyclic, nitrogenous tertiary base, in the presence of a free tertiary base of the same group.

2. The process of preparing quaternary ammonium compounds useful in the art of waterproofing textile fiber, which comprises forming a reaction mass containing the N-hydroxy-methyl derivative of a higher fatty-acid amide and a non-aqueous, non-alcoholic, organic liquid medium, containing a tertiary, nitrogenous, organic base, but containing no salts of said base and no other types of bases; the said N-hydroxy-methyl derivative being produced in situ in said liquid medium by reacting the corresponding higher fatty-acid amide with an agent yielding formaldehyde; then adding to said reaction mass a further quantity of said tertiary base and an acid-reacting reagent adapted to react with said tertiary base in situ to convert it into a water-soluble quaternary salt, and heating the reaction mass to effect further reaction between the N-hydroxy-methyl fatty amide first mentioned and said water-soluble quaternary salt.

3. The process of preparing quaternary ammonium compounds useful in the art of waterproofing textile fiber, which comprises forming a reaction mass containing the N-hydroxy-methyl derivative of a higher fatty-acid amide and a non-aqueous, non-alcoholic, organic liquid medium, containing a tertiary base of the group consisting of pyridine, the C-alkyl pyridines and quinoline, but containing no salts of said base and no inorganic bases; the said N-hydroxy-methyl derivative being produced in situ in said liquid medium by reacting the corresponding higher fatty-acid amide with an agent yielding formaldehyde; then adding to said reaction mass a further quantity of the same tertiary base and an acid-reacting reagent from the group consisting of hydrogen chloride, phosphorus trichloride, phosphorus oxychloride, thionyl chloride, phosphoric acid, phosphoric anhydride, glacial acetic acid and acetic anhydride, heating the reaction mass to effect further reaction between the N-hydroxy-methyl fatty amide first mentioned, the tertiary base and the acid-reacting reagent last mentioned, and separating the final reaction product from the non-aqueous, non-alcoholic, liquid medium and excess tertiary base, if any.

4. The process of producing a quaternary ammonium compound of the general formula R—CONH—CH$_2$N(tert)—X, wherein R is an alkyl radical having a chain of from 8 to 20 carbon atoms, N(tert) is the molecule of a tertiary base selected from the group consisting of pyridine, the C-alkyl pyridines and quinoline, and X is the anion of a water-soluble acid, which comprises forming a reaction mass containing a methylol compound of the formula R—CONH—CH$_2$OH, R having the same significance as above, in a non-aqueous, non-alcoholic, organic liquid medium consisting at least in part of a tertiary base of the group consisting of pyridine, the C-alkyl pyridines and quinoline, but containing no salts of said base and no inorganic bases; said compound of formula

R—CONH—CH$_2$OH being produced in situ, in at least a portion of said liquid medium, by reacting the corresponding amide of formula R—CONH$_2$ with an agent yielding formaldehyde; and then reacting said reaction mass with a water-soluble salt of a tertiary base of the group consisting of pyridine, the C-alkyl pyridines and quinoline, in the presence of the free base form of said tertiary base.

5. The process of producing a quaternary ammonium compound of the general formula R—CONH—CH$_2$—N(tert)—X, wherein R is an alkyl radical having a chain of from 8 to 20 carbon atoms, N(tert) is the molecule of a tertiary base selected from the group consisting of pyridine, the C-alkyl pyridines and quinoline, and X is the anion of a water-soluble acid, which comprises forming a reaction mass containing a methylol compound of the formula R—CONH—CH$_2$OH, R having the same significance as above, in a non-aqueous, non-alcoholic, organic liquid medium, containing a tertiary base of the group consisting of pyridine, the C-alkyl pyridines and quinoline, but containing no salts of said base and no inorganic bases; said compound of formula R—CONH—CH$_2$OH being produced in situ, in said liquid medium, by reacting the corresponding amide of formula R—CONH$_2$ with paraformaldehyde; then adding to said reaction mass a heterocyclic nitrogenous, liquid tertiary base in quantity sufficient to create in the reaction mass a quantity of said base at least equal to one mole per mole of the methylol compound therein formed, then further adding to said reaction mass an acid-reacting reagent of the group which are normally capable of converting pyridine into a water-soluble pyridinium compound, heating the resulting reaction mass to complete the reaction between said methylol compound, said tertiary base and said acid-reacting reagent, and recovering the reaction product.

6. The process of producing a quaternary ammonium compound of the general formula R—CONH—CH$_2$—N(tert)—X, wherein R is an alkyl radical having a chain of from 8 to 20 carbon atoms, N(tert) is the molecule of a tertiary base selected from the group consisting of pyridine, the C-alkyl pyridines and quinoline, and X is the anion of a water-soluble acid, which comprises forming a reaction mass containing a methylol compound of the formula R—CONH—CH$_2$OH, R having the same significance as above, in a non-aqueous, non-alcoholic, organic liquid medium, containing at least as part thereof a heterocyclic, nitrogenous, liquid tertiary base in quantity not less than 1 mole per mole of methylol compound to be formed therein; said compound of formula R—CONH—CH$_2$OH being produced in situ, in at least a portion of said liquid medium, by reacting the corresponding amide of formula R—CONH$_2$ with paraformaldehyde; then adding to the reaction mass an acid-reacting reagent of the group which are normally capable of converting pyridine into a water-soluble pyridinium compound, heating the resulting reaction mass to complete the reaction between said methylol compound, said tertiary base and said acid-reacting reagent, and recovering the reaction product.

7. The process of producing a quaternary compound of the general formula

wherein R is an alkyl radical having a chain of from 8 to 20 carbon atoms, while X is the anion of a water-soluble acid, which comprises reacting with paraformaldehyde on a fatty-acid amide of the formula R—CONH$_2$, R having the same significance as above, in a non-aqueous liquid medium consisting of a mixture of pyridine and a solvent of the group consisting of ethylene chloride, acetone, ethyl-methyl-ketone, benzene, hexane, and liquid petroleum fractions; then adding to said reaction mass an acid-reacting compound of the group consisting of hydrogen chloride, phosphorus trichloride, phosphorus oxychloride, thionyl chloride, phosphoric acid, phosphoric anhydride, glacial acetic acid and acetic anhydride; heating the reaction mass until further reaction has been completed, and separating the reaction product from the solvent and excess tertiary base.

8. The process of producing a stearamido-methyl-pyridinium salt having water-repellency powers, which comprises reacting stearamide with paraformaldehyde in a mixture of pyridine and a liquid ketone; then adding phosphorus oxychloride, heating the mass further to complete the reaction, and separating the solid reaction product from the liquid ketone and excess pyridine.

9. The process of producing a stearamido-methyl-pyridinium salt having water-repellency powers, which comprises reacting stearamide with paraformaldehyde in a mixture of pyridine and a liquid paraffin hydrocarbon, then adding phosphorus oxychloride, heating the mass further to complete the reaction, and separating the solid reaction product from the liquid paraffin hydrocarbon, and excess pyridine.

10. The process of producing a quaternary compound useful in the art of water-proofing textile fiber, which comprises heating together substantially 400 parts of stearamide, 65 parts of paraformaldehyde, 157 parts of pyridine and sufficient acetone to form a stirrable slurry, at 70 to 75° C. for from 6 to 22 hours, diluting the reaction mass with further quantities of acetone, cooling to substantially room temperature, adding substantially 74 parts of phosphorus oxychloride, heating again to about 58° C. for about 1 hour, distilling off the bulk of the acetone and cooling the residual melt to room temperature.

WALTER VALENTINE WIRTH.
ROBERT FREEMAN DEESE, Jr.

Certificate of Correction

Patent No. 2,212,654. August 27, 1940.

WALTER VALENTINE WIRTH ET AL.

It is hereby certified that error appears in the printed specification of the above numbered patent requiring correction as follows: Page 4, second column, lines 67 to 73 inclusive, strike out the formula and insert instead the following:

and that the said Letters Patent should be read with this correction therein that the same may conform to the record of the case in the Patent Office.

Signed and sealed this 1st day of October, A. D. 1940.

[SEAL]

HENRY VAN ARSDALE,
*Acting Commissioner of Patents.*